US00RE33861E

United States Patent [19]

Zetena et al.

[11] E Patent Number: Re. 33,861

[45] Reissued Date of Patent: Mar. 31, 1992

[54] POOL CHEMICAL DISPENSER

[75] Inventors: Christopher M. Zetena, Cincinnati, Ohio; Roy P. Alexander, Killingworth, Conn.

[73] Assignee: Olin Corporation, Cheshire, Conn.

[21] Appl. No.: 515,910

[22] Filed: Apr. 26, 1990

Related U.S. Patent Documents

Reissue of:

[64] Patent No.: 4,867,196
Issued: Sep. 19, 1989
Appl. No.: 238,446
Filed: Aug. 31, 1988

[51] Int. Cl.[5] ..... B01D 11/02

[52] U.S. Cl. ..... 137/268; 422/282; 422/264; 239/310

[58] Field of Search ..... 137/268, 205.5; 422/264, 274, 275, 276, 281, 282; 239/310

[56] References Cited

U.S. PATENT DOCUMENTS

| | | |
|---|---|---|
| 370,798 | 10/1887 | MacKintosh . |
| 976,665 | 11/1910 | Ledoux . |
| 2,808,934 | 10/1957 | Rivas . |
| 3,107,156 | 10/1963 | Fredericks . |
| 3,383,178 | 4/1968 | Dietz . |
| 3,401,116 | 9/1968 | Stanwood . |
| 3,474,817 | 10/1969 | Bates et al. . |
| 3,507,624 | 4/1970 | Schneider et al. . |
| 3,578,776 | 5/1971 | Schneider, Jr. et al. . |
| 3,802,845 | 4/1974 | Tepas, Jr. . |
| 3,846,078 | 11/1974 | Brett . |
| 3,864,090 | 2/1975 | Richards . |
| 3,972,966 | 8/1976 | Lund et al. . |
| 4,035,299 | 7/1977 | Vroeginday . |
| 4,181,702 | 1/1980 | Watson . |
| 4,199,001 | 4/1980 | Kratz . |
| 4,210,624 | 7/1980 | Price . |
| 4,250,911 | 2/1981 | Kratz . |
| 4,303,515 | 12/1981 | Rademacher . |
| 4,419,233 | 12/1983 | Baker . |
| 4,610,848 | 9/1986 | Weber . |
| 4,732,689 | 3/1988 | Harvey et al. . |

*Primary Examiner*—Alan Cohan
*Attorney, Agent, or Firm*—Bruce Burdick; Ralph D'Alessandro

[57] ABSTRACT

An improved chemical feeder employing periodic partial immersion in a forced circulation system is provided having a soluble chemical chamber, a dissolving chamber into which the soluble chemical chamber extends and a discharge chamber in fluid flow communication with the dissolving chamber to selectively receive chemically treated water from the dissolving chamber and discharge it into a flow loop connected to the forced circulation system.

31 Claims, 4 Drawing Sheets

POOL CHEMICAL DISPENSER

Matter enclosed in heavy brackets [ ] appears in the original patent but forms no part of this reissue specification; matter printed in italics indicates the additions made by reissue.

BACKGROUND OF THE INVENTION

This invention relates generally to apparatus for dispensing soluble material into a surrounding body of water. More particularly this invention deals with apparatus that dissolves and dispenses a soluble sanitizing material, preferably calcium hypochlorite, into a body of water, such as a swimming pool utilizing forced circulation.

Chemical feeders, used in previous forced flow or circulation systems, have certain common features. All have typically had a dissolving tank or chamber in which the dissolving of the chemical occurs and a chemical retainer in which the chemical is placed. The dissolving liquid, normally water, is typically fed into the dissolving tank by some control apparatus to ensure the proper amount of chemical dissolved.

Prior equipment, however, normally has suffered from wide fluctuations or variations in the amount of chemical that is dissolved and fed into the water. Most dispensers have utilized a solid chemical that is at least partially immersed in water to effect the dissolution.

Where the chemical is a solid hypochlorite, such as calcium hypochlorite, the solid residue of the chemical has presented either aesthetic or functional problems. When the solid residue has gotten into the forced circulation system, it has resulted in unsightly accumulation on the pool bottom. Build up within the feeder apparatus has resulted in clogging and eventual shutdown of the apparatus. This problem is compounded when larger, commercial pools are treated and larger feeders or dispensers must be used. This clogging also affects the reliability of the feed rate of the chemical into the pools, as well as increasing the frequency of maintenance for these prior feeders.

These problems are solved in the design of the present invention whereby a calcium hypochlorite dispenser operating on the principle of periodic partial immersion with three separate chambers and an improved metering system is provided.

SUMMARY OF THE INVENTION

It is an object of the present invention to provide an improved soluble solid chemical dispenser for a forced circulation system.

It is another object of the present invention to provide an improved calcium hypochlorite dispenser suitable for use in large commercial pools.

It is a feature of the present invention that the calcium hypochlorite dispenser utilizes three separate chambers to achieve uniform and controlled release of the calcium hypochlorite into the pool circulation system.

It is another feature of the present invention that a siphon tube is used to control the amount of water which immerses the solid pool chemical and, therefore, the concentration of the dissolved pool chemical, in the dissolving chamber and the flow of that water into the discharge chamber.

It is yet another feature of the present invention that vertically extendable bellows are connected to the siphon tube to permit the water level in the dissolving tank to be adjusted.

It is still another feature of the present invention that the dispenser utilizes periodic partial immersion to dissolve the chemical in the dissolving chamber.

It is an advantage of the present invention that a solid soluble chemical, such as calcium hypochlorite, is easily dispensed into large commercial sized swimming pools.

It is another advantage of the present invention that clogging of the dispensing apparatus from chemical residue is avoided.

These and other objects, features and advantages are obtained in the three chambered apparatus for dissolving and dispensing solid calcium hypochlorite into a swimming pool wherein the chemical is placed in a chemical chamber that extends down into a dissolving chamber that overlies and is in flow communication with the discharge chamber. The level of water that flows into the dissolving chamber is controlled by a vertically adjustable flow controller that controls the release of treated water from the dissolving chamber into the discharge chamber.

BRIEF DESCRIPTION OF THE DRAWINGS

The objects, features and advantages of the present invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
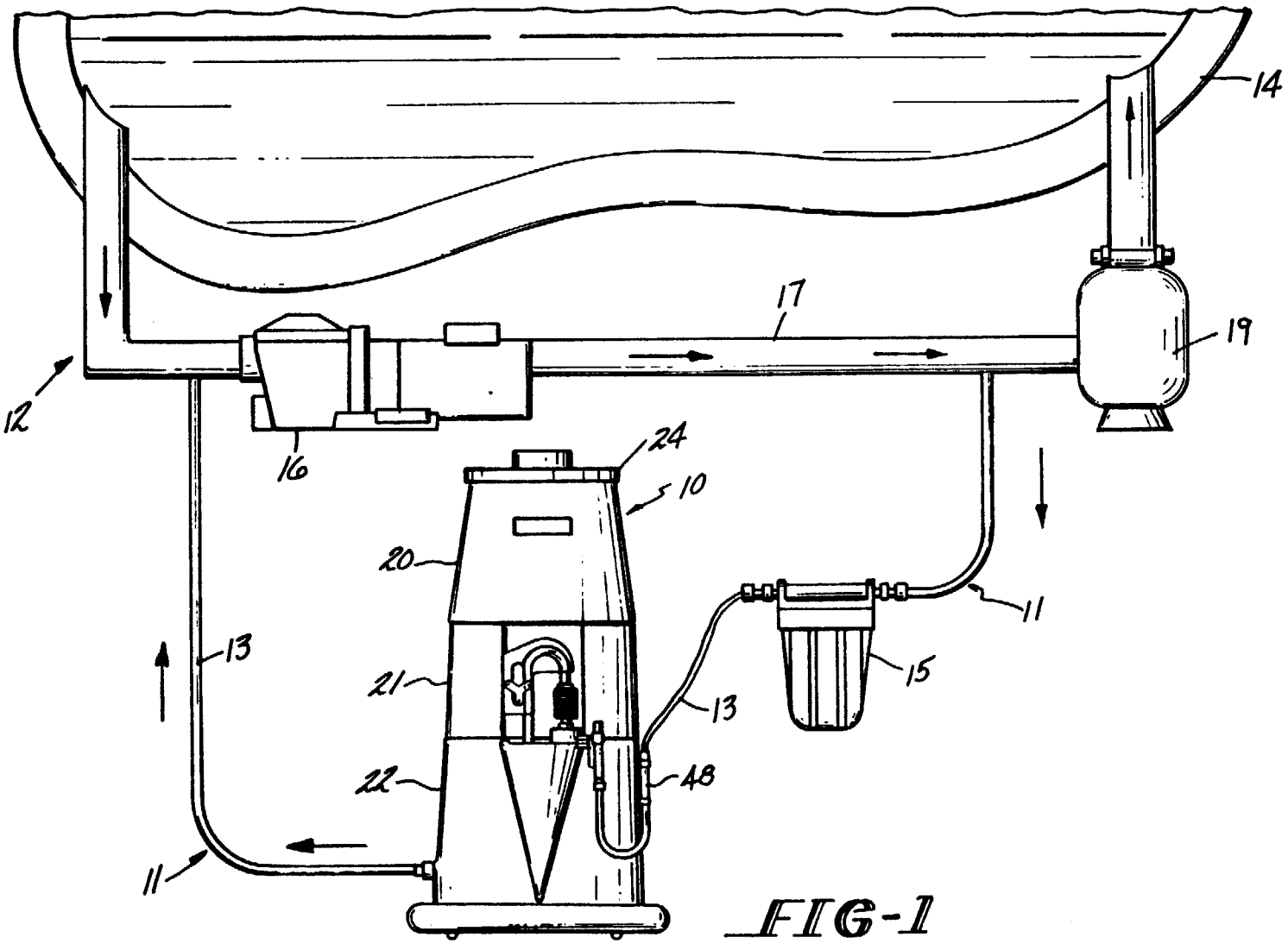
FIG. 1 is a diagrammatic illustration of the pool chemical dispenser of the present invention shown connected via a flow loop to a swimming pool.

FIG. 1 discloses the positioning of the pool chemical dispenser, indicated generally by the numeral 10, in the flow loops, indicated generally by the numeral 11 and 12, for the pool 14. Loop 11 connects the dispenser 10 to the pool flow loop 12 by a dispenser flow line 13. Flow line 13 has a filter and housing 15 attached via appropriate fittings on the feed side to receive water from the pool flow loop 12 downstream of forced circulation pump 16. Pool circulation flow line 17 circulates water from the pool 14 and a skimmer feeder (not shown) via forced circulation pump 16 through a pool filter 19 back into the pool. The outlet side of loop 11 connects into loop 12 on the upstream side of pump 16.

Figure 2:
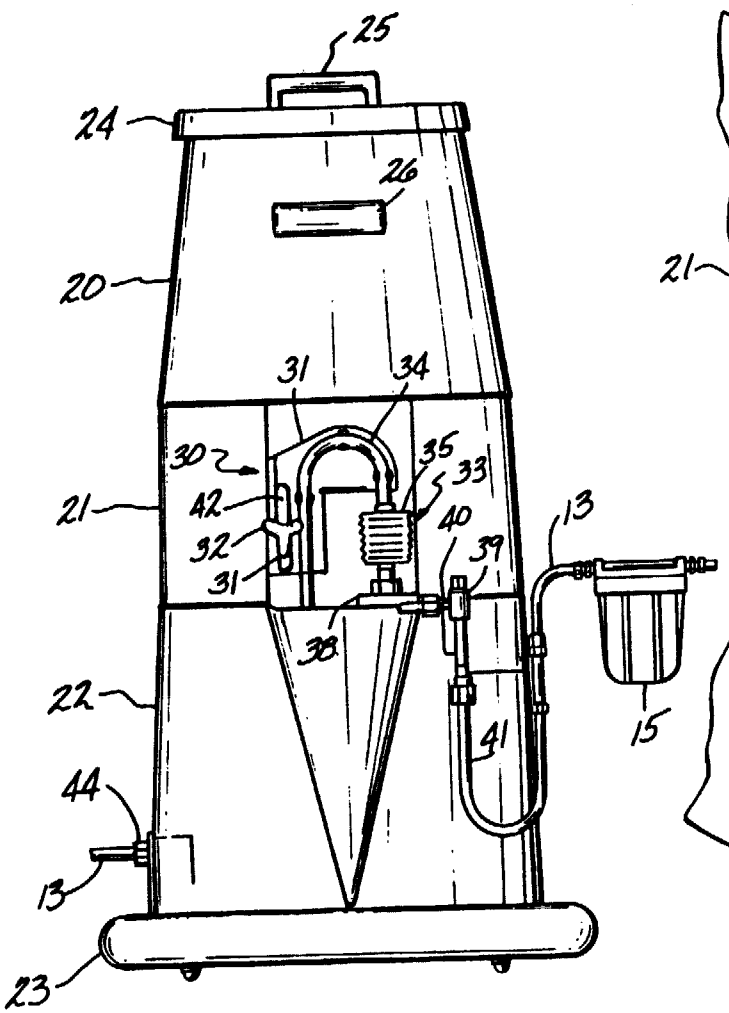
FIG. 2 is a side elevational view of the pool chemical dispenser.

As seen generally in FIG. 1 and more specifically in FIG. 2, dispenser 10 has an upper soluble material or chemical chamber 20, an intermediate dissolving chamber 21, inside of which the chemical chamber 20 seats, and a lower discharge chamber 22, inside of which the dissolving chamber seats. The three chambers 20, 21 and 22 are separate, facilitating cleaning and maintenance. The discharge chamber outlet check valve is shown as numeral 44 exiting the side of the discharge chamber 22 and connecting with the dispenser flow line 13.

Figure 6:
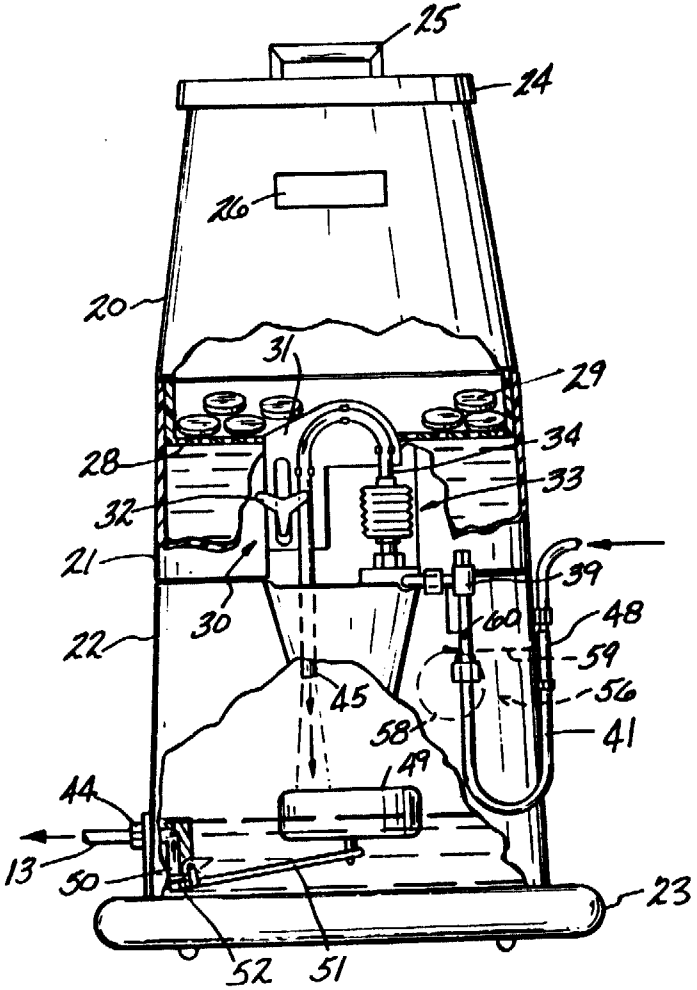
FIG. 6 is a side elevational view of the chemical dispenser with portions broken away to shown the water levels in the dissolving chamber and the discharge chamber after the chemically treated water has started to flow into the flow loop of FIG. 1 enroute to the pool and the water level has dropped below the level of the solid chemical in the chemical chamber.
Figure 5:
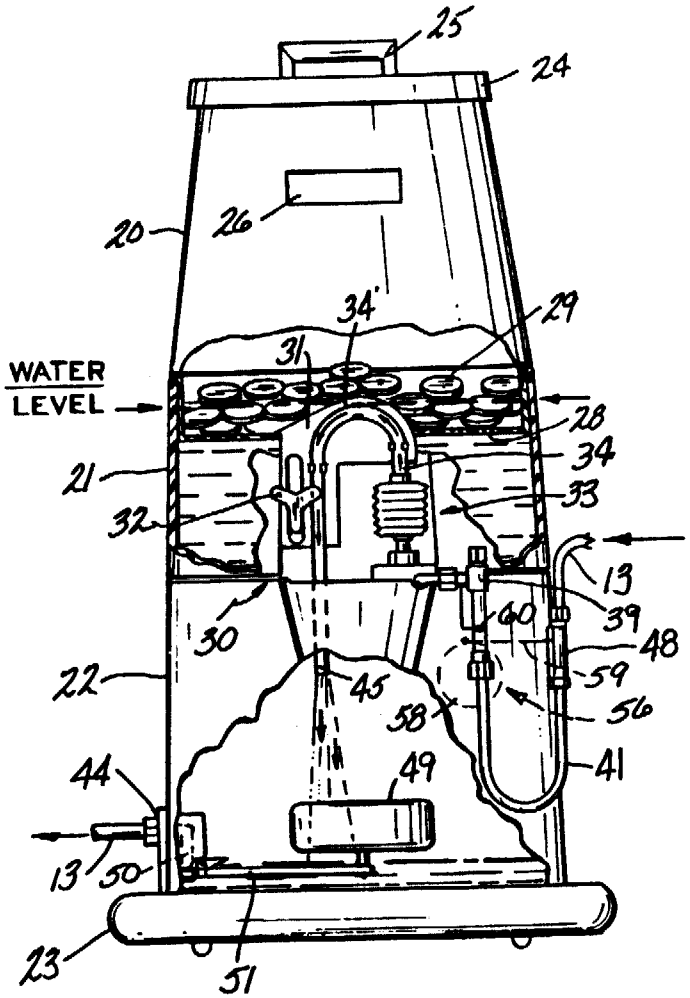
FIG. 5 is a side elevational view of the chemical dispenser with portions broken away to shown the water level in the dissolving chamber as the siphon tube assembly begins to drain the water from the dissolving chamber into the discharge chamber, as well as showing the chemical chamber extending into the dissolving chamber so that the solid chemical is partially immersed.

As is best seen in FIGS. 5 and 6 the chemical chamber 20 has a chemical support grid 28 which is perforated on the bottom to permit water in the dissolving chamber 21 to rise up therethrough into contact with the pool chemical tablets 29 to dissolve the tablets. Chemical chamber 20, when seated in dissolving chamber 21, extends down into chamber 21 so the solid chemical tablets 29 supported by grid 28 are partially immersed as the water fill cycle periodically fills the dissolving chamber 21 to the desired level determined by the water level control means, indicated generally by the numeral 30, in a manner that will be explained hereafter.

Chemical chamber 20 is seen with a removable top 24 to permit easy refill of the tablets 29. Top 24 has a grip handle 25 to facilitate removal. Chamber 20 also has side handle grips 26, only one of which is shown, to permit easy removal of chamber 20 from the dissolving chamber 21.

Figure 4A:
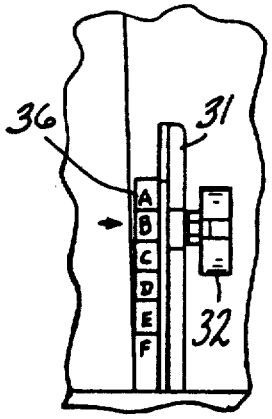
FIG. 4A is an enlarged side elevational view of the settings and the siphon tube apparatus that is vertically adjustable to a plurality of heights.
Figure 4:
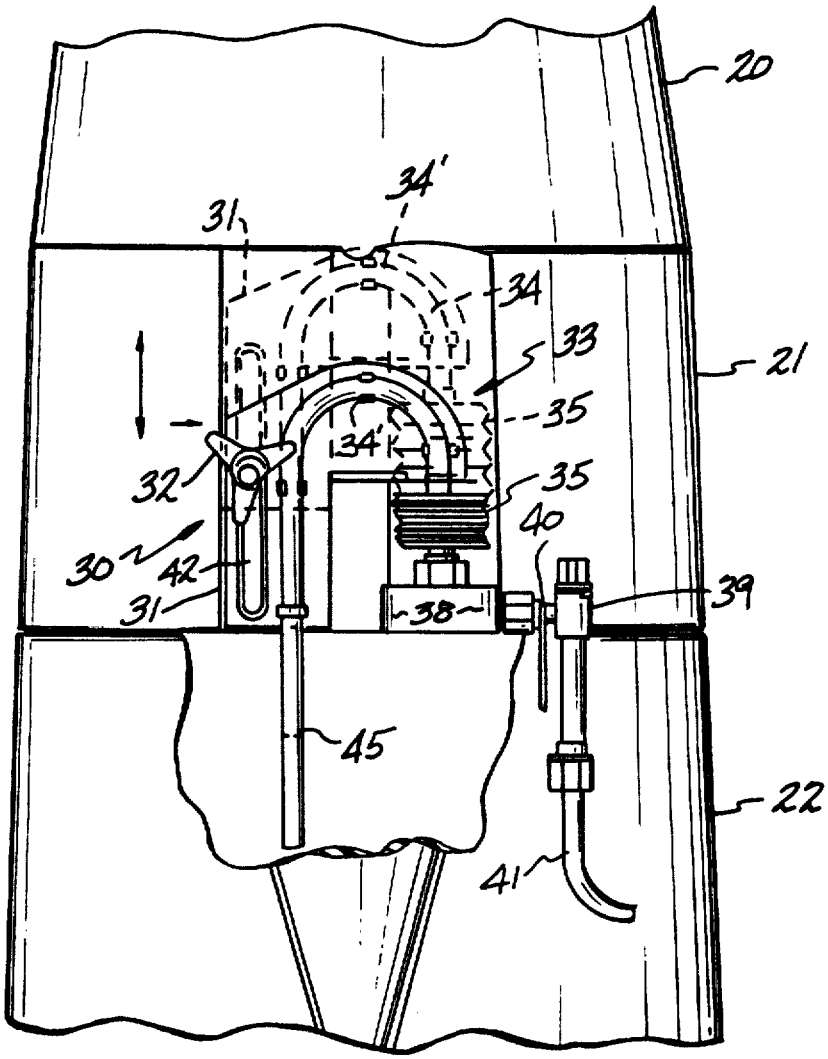
FIG. 4 is an enlarged partial side elevational view with a portion of the dispenser cut away and broken off to shown the vertical adjustability of the siphon tube apparatus.

As is best seen in FIGS. 2 and 4, dissolving chamber 21 has the aforementioned water level control means 30 fastened thereto. This consists of a vertically adjustable control plate 31 and a lock knob 32 that tightens via a conventionally threaded screw to retain the plate 31 at the desired height. FIG. 4 shows control plate 31 in a lowered position in solid lines and in a raised position in phantom lines. Control plate settings 36 are shown in FIG. 4A. Control plate slot 42 permits the control plate to be vertically adjustable.

Siphon assembly, indicated generally by the numeral 33 in FIGS. 3–6, is part of the water level control means 30 that permits the vertical adjustability to be achieved. Bellows 35 are formed from an appropriate flexible material, such as polyethylene, to allow the siphon tube 34 to be raised or lowered. This adjustability is best illustrated in FIG. 4 where the phantom lines show siphon tube 34 and control plate 31 in an elevated position and the solid lines show the same apparatus in a lowered position. Siphon tube 34 is formed from a suitable material, such as polyethylene or other plastic tubing, and is curved or arcuate in shape to permit it to be fastened to control plate 31 and to effectively function as a siphon break, moving up or down with control plate 31. Siphon tube lower section 45 of FIG. 4 is merely raised or lowered in the discharge chamber 22 as the control plate 31 is adjusted.

Figure 3:
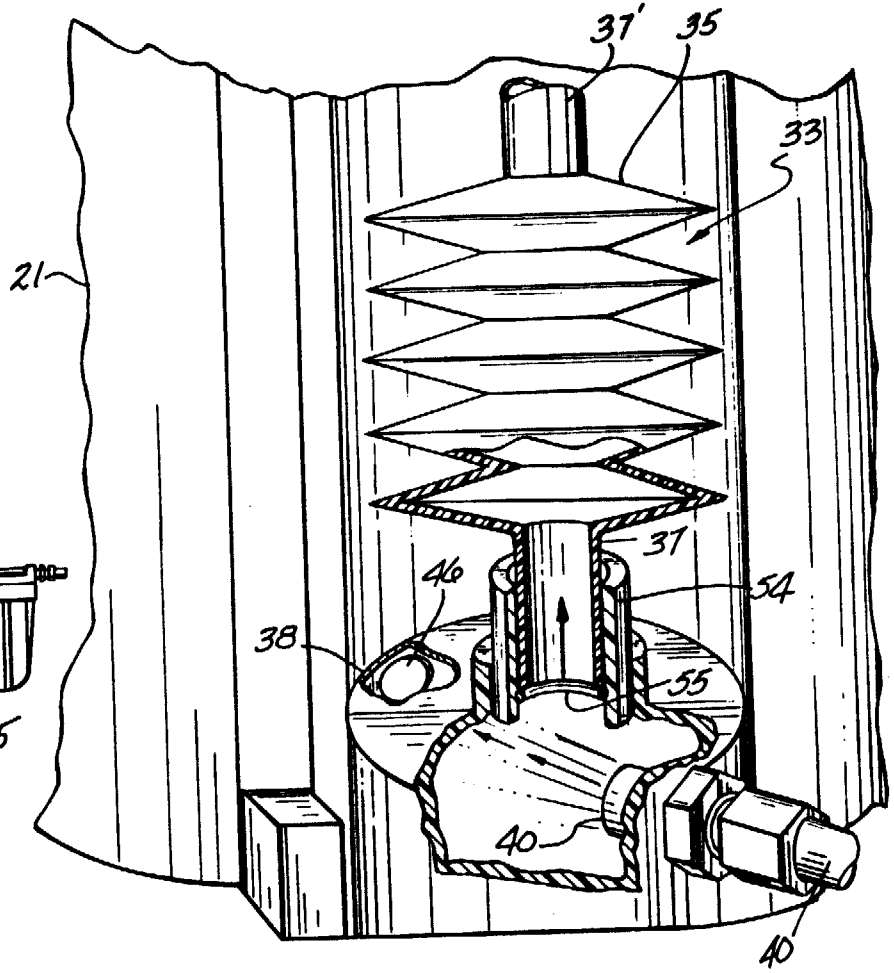
FIG. 3 is an enlarged view of the inlet for water that feeds into the siphon tube apparatus to feed water into the dissolving chamber, with a portion cut away to show the flow paths.

The curved upper portion of siphon tube 34 functions to control the water level attained in the dissolving chamber 21 from the water flowing in through the flow indicator 39 and the flow indicator feed line 41 to the flow indicator inlet connection 38 via the flow indicator outlet stem tube 40 of FIG. 3. Opening 46 in the inlet connection 38 opposite the outlet stem tube 40 permits the water to flow into dissolving chamber 21 as the water level rises in dissolving chamber 21. The hydraulic pressure within the inlet connection 38 from the water level in dissolving chamber 21 causes the water to rise up through bellows tubing 37 into the bellows 35 section so that the water level in the bellows is the same as the water level in the dissolving chamber 21. Bellows tubing 37 inserts within a stub connection 54 in the flow indicator inlet connection 38 and seats atop O-ring 55 recessed into the inner wall of stub connection 54 to effect a liquid tight seal.

As the water level continues to rise in dissolving chamber 21, the water rises through the bellows 35 section into the upper bellows tubing 37' and then into the siphon tube 34. Once the water level is sufficiently high in dissolving chamber 21 so that the corresponding water level in the siphon tube 34 rises into the curved portion 34' of the siphon tube 34, as seen in FIG. 5, the water starts draining through siphon tube 34 into the discharge chamber 22 at a faster flow rate than the water is flowing in through the flow indicator feed line 41 from the dispenser flow line 13 and the flow controller 48. The siphon tube 34 siphons the chemically treated water from the dissolving chamber 21 back through the flow indicator inlet connection opening 46 of FIG. 3 until the water is drained from the dissolving chamber 21 into the discharge chamber 22. The filling of the discharge chamber 22 and the corresponding lowering of the water level in the dissolving chamber 21 so the pool chemical tablets 29 are no longer immersed in water is shown in FIGS. 5 and 6.

Siphon assembly 33 stops the draining of water through siphon tube 34 from the dissolving chamber 21 to the discharge chamber 22 when air enters the bellows tube 37 in the flow indicator inlet connection because the chemically treated water with the dissolved pool chemical from the tablets 29 has been siphoned off to the lower discharge chamber 22 faster than the inlet flow of water so an air gap is created between the water level in the dissolving chamber and in the flow indicator inlet connection 38 and the bottom of bellows tube 37. This air breaks the siphon and permits the refill of the dissolving chamber 21 to occur to achieve the partial immersion of the pool chemical tablets 29 to recommence the periodic immersion and dissolution cycle. The diameter of the bellows 33 and bellows tube 37 must be wider than the siphon tube 34 to ensure there is a definite air/water break.

Flow controller 48, as seen in FIGS. 1, 5 and 6, provides a constant flow of water into the dispenser 10 via the dispenser flow line 13. This constant flow compensates for pressure fluctuations in the pump 16 of FIG. 1 that result from accumulation of residue that can obstruct flow in loop 12, and hence in dispenser flow loop 11 which can vary by as much as 15–35 pounds per square inch. The constant flow achieves uniform dissolution of the pool chemical tablets 29, resulting in a uniform pool chemical, such as chlorine, feed rate by having uniform cycle times between the filling of dissolving chamber 21 and the draining into discharge chamber 22.

The water level in chamber 22 rises so that the normally closed discharge chamber outlet check value 44 is opened by the action of discharge chamber outlet valve float 49 rising up with the increasing water level to open outlet orifice 50. This permits the chemically treated water to flow out through outlet check valve 44 into the dispenser flow line 13 to be drawn into the downstream side, with respect to circulation pump 16, of the pool circulation flow line 17. Circulation pump 16 then pumps the chemically treated water as shown in FIG. 1 through the filter 19 into the pool 14. Float 49 raises via the pivoting of a pivot arm 51 that pivots downward on the opposing discharge chamber outlet check valve 44 end to drop the valve cap 52 below the outlet orifice 50 to uncover the orifice 50.

As the water drains from the dissolving chamber 21 into the discharge chamber 22 via the siphon assembly 33, the unchecked flow of water into the dispenser 10 via the flow indicator feed line 41 is prevented by a safety overflow assembly, indicated generally by the numeral 56, in FIGS. 5 and 6. Assembly 56 consists of a ball float 58, which is mounted on a float arm 59, that rise upwardly when the water level in discharge chamber 22 reaches the level of the float 58. Float arm 59 extends into the flow controller 48 and connects with a suitable flow interrupter (not shown) which closes off the flow path through flow indicator feed line 41 to stop the flow of water into the dispenser 10. Once sufficient water has exited the discharge chamber 22 via the discharge chamber outlet check valve 44 and dispenser flow line 13, the ball float 58 and float arm 59 drop to reopen the flow path through the flow controller 48.

Flow indicator 39 has a ball 60 inside the clear tubing portion to indicate water flow and the quantity of water flowing into the dispenser 10. When the water flow drops below a predetermined rate indicated, for example, by a flow line on the clear tubing portion, the filter 15 in FIG. 1 requires cleaning. Flow indicator 39 can also have a shutoff valve incorporated into its top in addition to or in lieu of the safety overflow assembly 56 to stop all flow of water into the dispenser 10. The normal flow rate of water out through the siphon assembly 35 is about two times the rate of water entering the dissolving chamber through the flow indicator inlet connection to ensure that the chemically treated water can be siphoned out of the dissolving chamber 21 and a siphon break achieved to stop the flow.

The three chambers 20, 21 and 22 of dispenser 10 are made of any appropriate chlorine resistant material. Preferred is polyethylene, although polyacrylate and polycarbonate are two examples of the many other suitable materials that may be employed. Chemical chamber 20 is tapered so that it is narrower at the top than at the bottom to prevent bridging of the pool chemical tablets 29. This insures a continuous supply of tablets 29 on the chemical support grid 28 for periodic immersion.

In operation, pool chemical tablets 29 are placed in the chemical chamber 20 of dispenser 10 by removal of top 24 after the dispenser 10 has been connected to the pool flow loop 12 of FIG. 1 via the flow loop 11. The control plate 31 is elevated to the desired height and secured in position by tightening the lock knob 32 to control the depth of immersion of the pool chemical tablets 29 in water in the dissolving chamber 21. This setting, selected from the control plate setting 36, also determines the cycle time of the periodic immersions because the siphon tube 34, with its upper curved portion 34', moves with the control plate 31 to determine the water level at which the siphon assembly 33 siphons water from the dissolving chamber 21 into the discharge chamber 22. The amount of time which the pool chemical tablets 29 spend immersed in the water and the quantity of tablets 29 immersed also determine the concentration of the soluble pool chemical in the quantity of water in the dissolving chamber. Flow indicator 39 shows the continued flow of water into the flow indicator inlet connection 38 and, via the inlet connection opening 46, into the dissolving chamber 21.

As the water level in the dissolving chamber 21 rises, the water in the siphon assembly 33 correspondingly rises to the same height up through bellows tube 37, bellows 35, upper bellows tube 37' and siphon tube 34. When the water level inside dissolving chamber 21 and the corresponding level in the siphon assembly 33 reaches the height of the siphon tube curved top portion 34', the water in the siphon assembly flows through the curved top portion 34' and drains out the lower straight section 45 into the discharge chamber 22.

The water in dissolving chamber 21 continues to be siphoned into discharge chamber 22 until an air gap develops between the water level in flow indicator inlet 38 and the lower bellows tube 37. As the water rises in discharge chamber 22 the outlet valve float 49 raises to open the outlet orifice 50 via float pivot arm 50. Once outlet orifice 50 is opened the chemically treated water in the discharge chamber 22 is released into the flow loop 11 where it is drawn into the pool flow loop 12 by the forced circulation of the water by circulation pump 16.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in details, materials, and arrangement of parts which will occur to one of skill in the art upon reading of the disclosure.

What is claimed is:

1. Apparatus for dissolving and dispensing soluble material for the sanitizing of a body of water in flow communication with the body of water via a flow loop having an inlet and an outlet to the apparatus comprising in combination:

(a) a soluble material chamber for retaining the soluble material at a first level;

(b) a dissolving chamber positioned below the soluble material chamber connected via the inlet to the flow loop of water to receive water thereinto, the soluble material chamber extending down inside the dissolving chamber contactable with the water in the dissolving chamber to periodically immerse at least a portion of the soluble material in water in the dissolving chambers;

(c) a discharge chamber below the dissolving chamber and connected thereto for the periodic flow of water thereinto from the dissolving chamber to empty the water from the dissolving chamber to level below the first level for the soluble material in the soluble material chamber, the discharge chamber being connected to the flow loop of water to permit the water with the dissolved soluble material to selectively flow back into the outlet via an outlet port; and (d) control means for controlling the level of water that flows into the dissolving chamber and connected in flow communication with the dissolving chamber and the discharge chamber to periodically permit the flow of water from the dissolving chamber to the discharge chamber.

2. The apparatus according to claim 1 wherein the discharge chamber further includes discharge means for controlling the flow of water back into the flow loop through the outlet port.

3. The apparatus according to claim 1 wherein the dissolving chamber supports the soluble material chamber and the discharge chamber supports the dissolving chamber.

4. The apparatus according to claim 3 wherein the soluble material chamber further comprises a perforated bottom through which water in the dissolving container can pass to contact the soluble material.

5. The apparatus according to claim 4 wherein the perforated bottom supports the soluble material.

6. The apparatus according to claim 5 wherein the control means is further vertically adjustable to a plurality of heights to control the level of water in the dissolving chamber such that raising the control means increases the level of water and lowering the control means decreases the level of water in the dissolving chamber.

7. The apparatus according to claim 6 wherein the control means further comprises a siphon tube to permit water to flow from the dissolving chamber to the discharge chamber when the selected water level in the dissolving chamber corresponds to the height of the control means.

8. The apparatus according to claim 7 wherein the siphon tube is further concavely curved.

9. The apparatus according to claim 7 wherein the control means is further connected to vertically extendable flow means of a size wider in diameter than the siphon tube.

10. The apparatus according to claim 9 wherein the vertically extendable flow means is bellows connected on a first upper end to the siphon tube and on a second lower end to the dissolving chamber via an inlet connection connected to the flow loop.

11. The apparatus according to claim 10 wherein the bellows are removable.

12. The apparatus according to claim 1 wherein the soluble material chamber is tapered having a top and the perforated bottom, the top being narrower to prevent bridging of soluble material above the perforated bottom.

13. The apparatus according to claim 1 wherein the flow loop connecting to the inlet connection on the dissolving chamber has a flow indicator connected thereto.

14. The apparatus according to claim 1 wherein the flow loop connecting to the inlet connection has a prefilter attached thereto.

15. Apparatus for dissolving and dispensing soluble material for the sanitizing of a body of water in flow communication with the body of water via a flow loop comprising in combination:

(a) a soluble material chamber for retaining the soluble material at a first level;

(b) a dissolving chamber positioned below and supporting the soluble material chamber connected to the flow loop of water to receive water thereinto, the soluble material chamber being contactable with the water in the dissolving chamber to periodically immerse at least a portion of the soluble material in water in the dissolving chamber;

(c) a discharge chamber below and supporting the dissolving chamber and connected thereto for the periodic flow of water thereinto from the dissolving chamber to a level below the first level for the soluble material in the soluble material chamber, the discharge chamber being connected to the flow loop of water to permit the water to selectively flow back thereinto via an outlet port with the dissolved soluble material;

(d) control means for controlling the level of water that flows into the dissolving chamber and connected in flow communication with the dissolving chamber and the discharge chamber to periodically permit the flow of water from the dissolving chamber to the discharge chamber; and (e) discharge means for controlling the flow of water back into the flow loop through the outlet port including a float valve effective upon discharge of a predetermined quantity of water into the discharge chamber to permit water to flow into the outlet port and into the flow loop.

16. The apparatus according to claim 15 wherein the discharge chamber has overflow means to stop the flow of water into the dissolving chamber from the flow loop when the water inn the discharge chamber reaches a predetermined level.

17. The apparatus according to claim 16 wherein the overflow means further comprises a float valve connected to the flow loop and effective to stop the flow of water into the dissolving chamber when the water in the discharge chamber reaches the predetermined level.

18. Apparatus for dissolving and dispensing soluble material for the sanitizing of a body of water in flow communication with the body of water via a flow loop having an inlet and an outlet to the apparatus comprising in combination:

(a) a soluble material chamber having a perforated bottom for retaining and supporting the soluble material and permitting water to pass through to contact the soluble material, (b) a dissolving chamber positioned below and supporting the soluble material chamber connected via the inlet to the flow loop of water to receive water thereinto, the soluble material chamber extending down inside the dissolving chamber contactable with the water in the dissolving chamber [and];

(c) *a discharge chamber positioned below the dissolving chamber and adapted to be connected to the flow loop via the outlet: and*

(*d*) control means for controlling the level of water that flows into the dissolving chamber and connected in flow communication to the dissolving chamber and the discharge chamber, the control means further being vertically adjustable to a plurality of heights to control the level of water in the dissolving chamber by raising or lowering to increase or decrease, respectively, the level of water in the dissolving chamber, the control means further comprising a siphon tube through which water flows from the dissolving chamber when the water level in the dissolving chamber corresponds to the height of control means.

19. The apparatus according to claim 18 wherein the siphon tube is further concavely curved.

20. The apparatus according to claim 18 wherein the control means is further connected to vertically extendable flow means of a size wider in diameter than the siphon tube.

21. The apparatus according to claim 20 wherein the vertically extendable flow means comprises bellows connected on a first upper end to the siphon tube and on a second lower and to the dissolving chamber via an inlet connection connected to the flow loop.

22. The apparatus according to claim 21 wherein the bellows are removable.

23. The apparatus according to claim 18 wherein the soluble material chamber is tapered having a top and the perforated bottom, the top being narrower to prevent bridging of soluble material above the perforated bottom.

24. The apparatus according to claim 18 wherein the flow loop connecting to the inlet connection on the dissolving chamber has a flow indicator connected thereto.

25. The apparatus according to claim 18 wherein the flow loop connecting to the inlet connection has a prefilter attached thereto.

26. The apparatus according to claim 18 further including a discharge chamber below and supporting the dissolving chamber and connected thereto for the selective flow of water thereinto, the discharge chamber being connected to the flow loop of water to permit the water with the dissolved soluble material to selectively flow back into the outlet via an outlet port.

*27. Apparatus for dissolving and dispensing soluble material for the sanitizing of a body of water adapted to be connected in flow communication with the body of water via a flow loop having an inlet and an outlet to the apparatus comprising in combination:*

*(a) a dissolving chamber for containing and dissolving the soluble material, the chamber having an inlet port which also serves as the outlet port of the chamber;*

*(b) a discharge chamber adapted to be connected in fluid communication with the outlet;*

*(c) an outlet passageway in fluid communication with the discharge chamber;*

*(d) a fluid inlet connector in fluid communication with the inlet, the inlet port and the outlet passageway; and*

*(e) a flow control means for causing the periodic immersion of the soluble material and forcing periodic flow of water and dissolved soluble material from the dissolving chamber through the fluid inlet connector and the outlet passageway and into the discharge chamber.*

*28. Apparatus for dissolving and dispensing soluble material for the sanitizing of a body of water adapted to be connected in flow communication with the body of water via a flow loop having an inlet and an outlet to the apparatus comprising in combination:*

*(a) a dissolving chamber for containing and dissolving the soluble material, the chamber having an inlet port which also serves as the outlet port of the chamber;*

*(b) an outlet passageway adapted to be connected in fluid communication with the outlet;*

*(c) a fluid inlet connector in fluid communication with the inlet, the inlet port and the outlet passageway; and*

*(d) a flow control means for causing the periodic immersion of the soluble material and forcing periodic flow of water and dissolved soluble material from the dissolving chamber through the fluid inlet connector into the outlet passageway,*

*(e) wherein said outlet passageway opens vertically downward and the inlet port opens horizontally adjacent to and immediately below the outlet passageway.*

*29. Apparatus for dissolving and dispensing soluble material for the sanitizing of a body of water adapted to be connected in flow communication with the body of water via a flow loop having an inlet and an outlet to the apparatus comprising in combination:*

*(a) a dissolving chamber for containing and dissolving the soluble material, the chamber having an inlet port which also serves as the outlet port of the chamber;*

*(b) an outlet passageway adapted to be connected in fluid communication with the outlet;*

*(c) a fluid inlet connector in fluid communication with the inlet, the inlet port and the outlet passageway; and*

*(d) a flow control means for causing the periodic immersion of the soluble material and forcing periodic flow of water and dissolved soluble material from the dissolving chamber through the fluid inlet connector into the outlet passageway,*

*(e) wherein the outlet passageway is a siphon tube and the inlet port opens adjacent the entrance of the siphon tube.*

*30. The apparatus of claim 27, further comprising:*

*a water level adjustment siphon in fluid communication with the outlet passageway.*

*31. The apparatus of claim 28, further comprising a discharge chamber in fluid communication with the outlet passageway and with the outlet.*

* * * * *